United States Patent
Lasky

(10) Patent No.: US 12,375,861 B1
(45) Date of Patent: Jul. 29, 2025

(54) ASSISTED HEARING AID WITH SYNTHETIC SUBSTITUTION

(71) Applicant: GN HEARING A/S, Ballerup (DK)

(72) Inventor: Michael B. Lasky, Seattle, WA (US)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 18/587,401

(22) Filed: Feb. 26, 2024

Related U.S. Application Data

(63) Continuation of application No. 18/061,377, filed on Dec. 2, 2022, now abandoned, which is a continuation of application No. 17/005,715, filed on Aug. 28, 2020, now Pat. No. 11,528,568, which is a continuation of application No. 16/539,344, filed on Aug. 13, 2019, now Pat. No. 10,791,404.

(60) Provisional application No. 62/718,205, filed on Aug. 13, 2018.

(51) Int. Cl.
H04R 25/00 (2006.01)
G10L 15/08 (2006.01)
G10L 25/27 (2013.01)

(52) U.S. Cl.
CPC .............. *H04R 25/70* (2013.01); *G10L 25/27* (2013.01); *H04R 25/30* (2013.01); *H04R 25/43* (2013.01); *G10L 15/08* (2013.01); *H04R 2225/41* (2013.01)

(58) Field of Classification Search
CPC ........ H04R 25/70; H04R 25/30; H04R 25/43; H04R 2225/41; G10L 25/27; G10L 15/08; G10L 21/02
See application file for complete search history.

(56) References Cited

U.S. PATENT DOCUMENTS

| | | | | |
|---|---|---|---|---|
| 5,117,461 A | * | 5/1992 | Moseley | G10K 11/17857 |
| | | | | 381/163 |
| 6,035,050 A | * | 3/2000 | Weinfurtner | H04R 25/507 |
| | | | | 381/313 |
| 6,336,092 B1 | * | 1/2002 | Gibson | G10H 1/366 |
| | | | | 704/207 |
| 7,676,372 B1 | * | 3/2010 | Oba | G09B 21/009 |
| | | | | 704/271 |
| 7,738,667 B2 | | 6/2010 | Bramsloew | |

(Continued)

FOREIGN PATENT DOCUMENTS

WO 2004056154 7/2004

*Primary Examiner* — Michael Colucci
(74) *Attorney, Agent, or Firm* — HSML P. C.

(57) ABSTRACT

A device and method for improving hearing devices by using computer recognition of words and substituting either computer generated words or pre-recorded words in streaming conversation received from a distant speaker. The system may operate in multiple modes such as a first mode being amplification and conditioning of the voice sounds; a second mode having said microphone pickup up the voice sounds from a speaker, a processor configured to convert voice sounds to discrete words corresponding to words spoken by said speaker, generating a synthesized voice speaking said words and outputting said synthesized voice to said sound reproducing element, which is hearable by the user. Other modes include translation of foreign languages into a user's ear and using a heads up display to project the text version of words which the computer had deciphered or translated. The system may be triggered by eye moment, spoken command, hand movement or similar.

21 Claims, 2 Drawing Sheets

(56) References Cited

U.S. PATENT DOCUMENTS

| | | | |
|---|---|---|---|
| 9,584,946 B1* | 2/2017 | Lyren | H02M 1/08 |
| 9,613,633 B2* | 4/2017 | Krini | G10L 15/00 |
| 10,841,724 B1* | 11/2020 | Tran | G06F 3/013 |
| 2003/0046062 A1* | 3/2003 | Cartus | G06F 40/166 |
| | | | 704/10 |
| 2003/0065508 A1* | 4/2003 | Tsuchinaga | G10L 19/173 |
| | | | 704/215 |
| 2004/0136542 A1* | 7/2004 | Denda | H04R 25/70 |
| | | | 381/60 |
| 2004/0208331 A1 | 10/2004 | Chalupper | |
| 2005/0055204 A1* | 3/2005 | Florencio | G10L 21/04 |
| | | | 704/E21.017 |
| 2005/0177528 A1* | 8/2005 | Qamar | G06F 21/645 |
| | | | 705/404 |
| 2006/0036439 A1* | 2/2006 | Haritaoglu | G10L 21/0364 |
| | | | 704/E21.009 |
| 2006/0111899 A1* | 5/2006 | Padhi | G10L 19/005 |
| | | | 704/E19.003 |
| 2010/0034406 A1* | 2/2010 | Fischer | H04R 3/005 |
| | | | 381/317 |
| 2010/0135511 A1* | 6/2010 | Pontoppidan | H04R 25/505 |
| | | | 381/313 |
| 2011/0299711 A1* | 12/2011 | Nielsen | H04R 25/30 |
| | | | 381/315 |
| 2012/0063620 A1* | 3/2012 | Nomura | H04R 25/407 |
| | | | 381/316 |
| 2013/0142365 A1* | 6/2013 | Lord | H04R 25/554 |
| | | | 381/312 |
| 2013/0282373 A1* | 10/2013 | Visser | G10L 21/0208 |
| | | | 704/231 |
| 2013/0304459 A1* | 11/2013 | Pontoppidan | H03G 3/00 |
| | | | 381/104 |
| 2014/0052439 A1* | 2/2014 | Rose | G10L 19/09 |
| | | | 704/219 |
| 2014/0185850 A1* | 7/2014 | Fitz | H04R 25/50 |
| | | | 381/320 |
| 2015/0025662 A1* | 1/2015 | Di Censo | G06F 3/165 |
| | | | 700/94 |
| 2015/0036850 A1* | 2/2015 | Barthel | H04R 25/40 |
| | | | 381/313 |
| 2015/0120293 A1* | 4/2015 | Wohlert | G10L 21/10 |
| | | | 704/235 |
| 2015/0139459 A1* | 5/2015 | Olsen | H04R 25/552 |
| | | | 381/315 |
| 2015/0208956 A1* | 7/2015 | Schmitt | A61B 5/123 |
| | | | 600/559 |
| 2016/0086599 A1* | 3/2016 | Kurata | G10L 15/187 |
| | | | 704/243 |
| 2016/0088404 A1* | 3/2016 | Oshima | H03G 11/02 |
| | | | 381/316 |
| 2016/0111111 A1* | 4/2016 | Levitt | G10L 21/013 |
| | | | 704/226 |
| 2016/0157030 A1* | 6/2016 | Odame | H04R 25/43 |
| | | | 381/313 |
| 2017/0064463 A1* | 3/2017 | Greenberger | H04R 25/405 |
| 2017/0069321 A1* | 3/2017 | Toiyama | G10L 17/02 |
| 2017/0359666 A1* | 12/2017 | Lyren | G10L 25/81 |
| 2019/0028817 A1* | 1/2019 | Gabai | H04R 25/407 |

\* cited by examiner

Vocabulary Mapping

| English words | Speaker1 captured data ID | Speaker2 captured data ID | Computer generated |
|---|---|---|---|
| The | 1112 | 1113 | 1114 |
| Be | 2115 | 2116 | 2117 |
| To | 3225 | 3226 | 3227 |
| And | 4022 | 4023 | 4024 |
| ... | | | |

Fig. 2

Learning/Translational Vocabulary Mapping

| Danish (English) words | Computer generated |
|---|---|
| Den (the) | 1114 |
| Vaere (to be) | 2117 |
| Till (to) | 3227 |
| Og (and) | 4024 |
| ... | |

Fig. 3

ASSISTED HEARING AID WITH SYNTHETIC SUBSTITUTION

TECHNICAL FIELD

This invention relates to a hearing aid, such as a behind-the-ear (BTE), in-the-ear (ITE), completely-in-canal (CIC) hearing aid, or a future implanted device, for improving hearing quality for persons with hearing loss and as a language assistive device for hearing unimpaired wearers.

BACKGROUND

Hearing aids work primarily by amplifying and conditioning the sound around them to adapt to the wearers particular hearing condition. This works quite well except for those wearers with very profound hearing loss. For these users, it is not enough to amplify and clarify. Rather, they need to have a much higher s/n ratio and perhaps even need to have the words they are hearing to be pronounced more clearly and in a voice which is attuned to their hearing loss.

A similar problem is encountered by learners of a new language. Though their hearing may be fine, they can miss a word altogether because of different accents or simply because the clarity and speed of a native speaker's speech may be very different from what the beginner user expects.

Another related opportunity is to create "super hearing" capabilities in persons not hearing impaired, so that they can hear what is in reality beyond their hearing range (distance and frequency).

It is known to ascertain the wearer's noise environment and adapt the sound filters dynamically to improve the signal to noise (s/n) ratio. An example of such an endeavor is found in U.S. Pat. No. 7,738,667 issued to Bramsloew et. al. on 15 Jan. 2010. Other learning features of a hearing aid generally relate to the data logging a user's interactions during a learning phase of the hearing aid, and to associating the user's response (changing volume or program) with various acoustical situations. Examples of this are disclosed in, for example, U.S. Pat. No. 6,035,050, US patent publication no. 2004/0208331, and international patent application no. WO 2004/056154, which all include U.S. Pat. No. 7,738,667, incorporated in the below specification by reference for background purposes.

As mentioned, adapting the s/n filter characteristics often is not enough and if the wearer wants to play back a missed word that is impossible to discern.

It is also known that a hearing aid wearer is going to communicate with a very small group of speakers for a large portion of their communications. Therefore, if perhaps 75% of all communications could be improved, that would be a substantial help to the wearer.

SUMMARY

The claims provide the detailed scope of this patent, but to assist the user in understanding the full specification, the following high level summary is provided.

There is disclosed an assisted hearing device for a user comprising:
  a. at least one microphone to pick up voice sounds from a speaker;
  b. a sound reproducing element to provide sound output to a user;
  c. said device capable of operating in two modes:
    i. a first mode being amplification and conditioning of the voice sounds of said speaker and outputting said sounds to said sound reproducing element; and
    ii. a second mode having said microphone pickup up the voice sounds from a speaker, a processor configured to convert voice sounds to discrete words corresponding to words spoken by said speaker, generating a synthesized voice speaking said words and outputting said synthesized voice to said sound reproducing element, which is hearable by the user.

Also disclosed is a method of providing clearer word sounds to the user wearing a hearing assist device comprising the steps of:
  a. processing the sound of a speaker of spoken words;
  b. converting the spoken words into a plurality of discrete words and storing said discrete words in a first data base;
  c. drawing from a second data base of synthesized words, replacing at least some of the discrete words from said first data base, with words of like meaning but generated by a synthesized voice, whenever words of like meaning are available in said second data base;
  d. outputting said replaced words to a sound generator from the device, so that the user will hear at least some clearer synthesized words replacing actual speaker's words.

Many other ideas and concepts are disclosed in the remainder of the application below.

BRIEF DESCRIPTION OF THE FIGURES

FIG. 2 is a data table showing how words spoken by the designated speakers are paired to synthesized speech.

FIG. 3 is a data table showing how words spoken are paired to synthesized speech where one language is substituted for another, in this case Danish for English.

DETAILED DESCRIPTION

Figure 1:
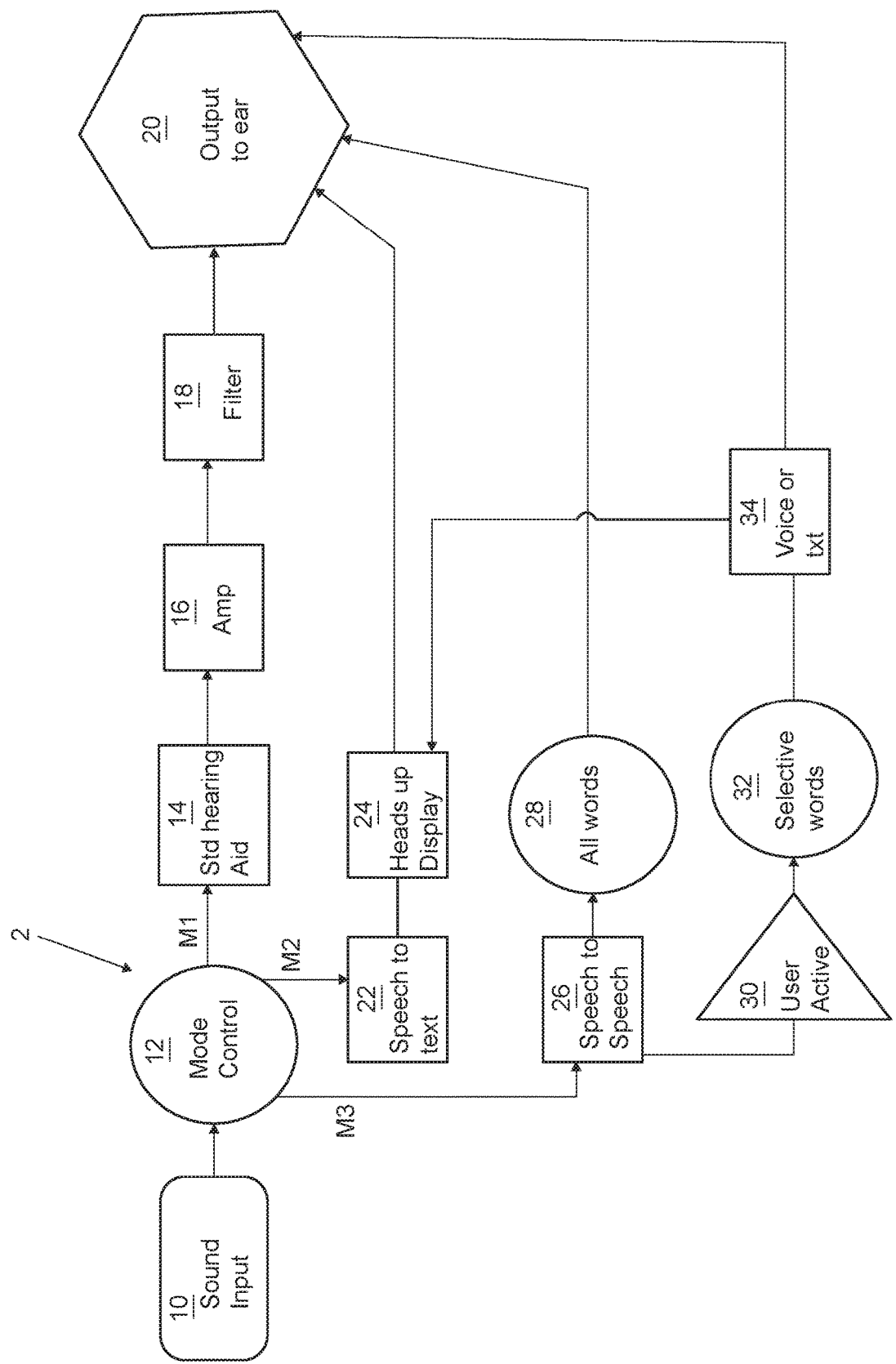
FIG. 1 is a schematic diagram of a system according to this disclosure.

Hearing impaired persons as well as learners of a new language, often have difficulty discerning individual words from the fast flow of words in a sentence. There are many reasons for this, but the solution is often the same: have the speaker repeat the word more slowly and clearly. Unfortunately, that is often impossible in most conversations. The speaker may be far away or speaking from a one way broadcast (such as television/radio) or for many other reasons.

One solution to this problem is to have the assisted hearing device determine the words spoken and convert them to replace spoken words with more clearly pronounced works (better pronunciation), such as text and computer speech and substituted synthetically (computer) generated identical words for the spoken word, only the generated words would have excellent signal to noise (clarity) ratios.

Often a computer can "hear" and convert speech into text/speech to speech more accurately than an impaired listener or a new language learner or a distant sound which the human ear can't resolve. A technique which this disclosure provides is to use computer resolution of a distant sound into a word known in the computer's data table (speech to text) and then outputting the data table word in synthetic sound and/or text to the hearing aid wearer. This works because there will be words which cannot be "rehabilitated" from a now s/n level sufficiently for a human to discern, but which a computer with current or future software can. As such the synthetically generated speech, will always have a superior s/n ratio.

Furthermore, since it is known that a high percentage of communications are between known parties, special methods can be employed to vastly increase the accuracy and speed of the speech to text/speech to speech conversion.

In one embodiment, the hearing assistive device converts some or all of a distant speaker's words (spoken speech) speech into discrete words which can be represented by an ID/code or simply in these text (spelled out) format. Once words have been converted to a code, prerecorded or computer generated synthesized voice (or prerecorded human voice), can be substituted for all or some of the detected speech/words. The speech which is ultimately sent to the hearing aid/sound device may contain all substituted words, or some substituted words is combined with the actual spoken words of the distant speaker, in the same word order as spoken, is then transmitted into the ear of the wearer ("interpreted mode"). This interpreted mode can be switched on selectively, for example, if the wearer is noticing that he/she is missing words, he/she can switch to interpreted mode.

In the interpreted mode, the user may hear some or all of the spoken speech, interspersed with computer substituted words. This can happen in an automated mode where computer makes a determination based on threshold values, such as s/n ratios, or other objective criteria that the spoken speech cannot be amplified and/or filtered to make it clear or "clean" enough for a user to understand. One threshold might be signal to noise. If the s/n ratio is too low, the substitution is made if the computer has been able to create a discrete word from the spoken speech word and there is a synthesized equivalent available in a data table.

Of course, in real time, this processing must be very fast so that user will not have the hearing aid interpreted mode word injection and the live (distant speaker) sound track too far apart, but there are ways to remedy this.

To gain speed, while faster smaller processors are being developed, processing can take place away from the hearing device itself, such as at a server or in the cloud/internet. This may also introduce some delays, but it should be remembered that like watching subtitles created in real time on television, which are always out of sync is not as serious when compared to not hearing right words. As processing speeds and capacities increase, this problem will diminish.

There are also ways to minimize the sync problem. When a computer generated or stored word is substituted and inserted in the sound output stream to the user the output stream my fall behind the real time spoken words. It is possible however to "catch up" with real time, but removing "dead air" between words and syllables, as known in speech compression with pitch correction technologies currently available. For example, see wikipedia.org regarding time-compressed speech (https://en.wikipedia.org/wiki/Time-compressed_speech). Such compression technologies have never been used for this purpose; rather, they are used only to allow a listener to shorten listening time of a recording.

In this embodiment, the hearing device amplifies and conditions the ambient conversation as prior art devices, but simultaneously, or on user command, listens to the conversations and converts each audible word into computer speech and/or text. (Interpreted mode) Computer speech may be synthesized or human speech recreated word by word from a data table.

The processing for this conversion can take place in the hearing device itself or preferably in a separate device linked thereto, such as a smart phone or other user carried device, or a wirelessly linked ground station such as a cell tower or Wi-Fi network.

If the user needs constant hearing assistance beyond that of the prior art hearing aids, the system can be in constant interpretive mode and the wearer will only hear synthetic speech, but it will be very clear and distinct as it does not amplify the ambient conversation, but rather converts it to substituted speech.

In the alternative, the user may activate interpretive mode when needed. In addition, the user may activate it when a particular word or phrase is missed. Because this may case the user to fall behind in the conversation, the system may remain in full interpretive mode until it has "caught up" to the real time conversation. That is possible because the system can compress speech in known ways such as removing/shortening dead air spaces between words and syllables or in other ways currently known for increasing speech throughput.

In this way, a user can catch a missed word but not lose the flow of the conversation.

The user can trigger interpretative mode by manual (switch) activation, or by other more sophisticated means, such as eye movement, hand gesture, voice prompt, minimum threshold s/n level, etc. For example, a user can trigger interpretive mode by, touching the hearing aid, nodding their head, moving a hand, or saying "help" and exit the mode by similar or other measures, such as saying "stop" or touching the hearing aid.

A foreign language learner can also benefit from this system. Often foreign words are spoken quickly and without much separation from each other. A learner can activate the interpretive mode to repeat the problematic word in synthetic speech format with the same catch-up capability per above. Additionally, the system could have a translation mode which substitutes another language for that being spoken. This would however require higher processing power since sentence structure between languages is not the same and the translation of a word or phrase would need to take context into account. In such a case, it would be preferable to run the system in translation mode constantly so that the context would be constantly tracked.

That is also true in interpretive mode. Context is helpful in allowing the system to predict the right word when the s/n ration is poor or there are several possible choices. Context suggestion is being done on smart phones with their texting apps.

In some cases, interpretation mode reliability would be greatly enhanced if the system was trained to know the distant speaker's voice. Considering that people communicate more with a limited group more than anyone else, capturing the voice of a limited number of people can have an overall dramatic increase in the reliability and throughput of the system. In known speech to text systems, the user is told to train the system to know its peculiar voice and pronunciation. If the user/wearer has regular conversations with 5 people (aka known speakers), for example, the user could have each of them interact with a voice recording system to pronounce and capture a limited number of words or phrases. Certain words may be known to be problematic for hearing impaired users, such as words between with voiced and unvoiced consonants (example ball and Paul).

Also foreign languages have words which are difficult to distinguish, and the system can maintain a lexicon of such words. The known speakers can provide several lists of words for a data file. For example, 1) a predetermined number of common words 2) a number of troublesome words, such as mentioned above) and 3) a list of words which sound different when spoken together (as in French speaking known as liaison). The lists are valuable to speed capture and processing. The lists can also make interpretive mode sound more normal, by providing the known speaker's own voice when in interpretive mode.

Since the system is going to have to convert voice to discrete words, it can output those words with synthesized voice or by text. Text can be used by providing the user with virtual reality augmented glasses or other heads up device, such as Google® glass spectacles which project text within the sight of the wearer. This would be the equivalent of open captioning or subtitles.

In a complex conversation with several speakers, the hearing device could be set to operate in a unidirectional mode. While the hearing aid is operating in normal prior art mode, it can simultaneously have a directional microphone which the user can direct, such as by turning his/her head or by other means, such as a separate microphone user (such as a smart phone) where and be manually directed toward a particular speaker regardless of what the hearing aid is picking up omnidirectional mode.

Fast processor speed is helpful so that the user is not hearing ambient speech and interpreted speech out of sync, but since this system is most helpful to those who need substantial hearing assistance, even slightly out of sync interpretation will still be a vast improvement. Furthermore, if the user is wearing an in-the-ear assistive device, real time speech can be substantially blocked. By adding side-tone technology as known in the art, the user can avoid shouting in response to a speaker's interpreted voice.

Another aspect of this disclosure is a notification system, where the speaker is notified when the user has switched to interpreted mode. This could be a light source, similar to an "on air" light, which the distant speaker can see. This would warn the speaker to enunciate or slow down, or in the case of a foreign language interpretation, use simpler terminology.

If the user and speaker are communicating by electronic means, i.e. not face to face, the electronic means (such as a smart phone) may have an indicator (audible or visual) which will warn the speaker of these conditions. Imagine speaking to someone in a foreign language and being notified when they are having trouble understanding you. This would give you the opportunity to slow down or make some other change before the user/listener has completely lost your meaning.

In one embodiment the assisted hearing device for a user could have:
 a. at least one microphone to pick up voice sounds from a distant speaker (i.e. a person speaking spoken words);
 b. a sound reproducing element to provide sound output to a user, such as an audio transducer in a hearing aid.

The device may operate in one or mode modes. For example, a first mode being amplification and conditioning of the voice sounds of said speaker and outputting said sounds to said sound reproducing element. This would be a state of the art hearing aid mode. Of course, there will be times when, for certain users, this mode is insufficient to provide clear audible words.

A second mode, which can be a stand-alone or part of the first mode is using the microphone pickup up voice sounds from a speaker (i.e. spoken words) and using a processor and an algorithm known in the art (see for example: https://en.wikipedia.org/wiki/Talk %3AList_of_speech_recognition_software and https://simple.wikipedia.org/wiki/Text-_to_Speech to convert text back to speech) to convert voice sounds to discrete words corresponding to words spoken by said speaker. Once a spoken word is converted into discrete words, they can be outputted in text or computer generated sound. Here, one can store these discrete words in a data base table and assign them a code. See FIG. 1.

In FIG. 2, common English words are stored in a data table. In reality the table would contain as many words as possible, but only common ones are shown because they would occur most often. These words are associated with captured (and perhaps digitized) words prerecorded from Speakers 1 and 2. The words in the three columns are the same, but with a different voice. The $4^{th}$ column is the computer generated synthesized words stored in the data base, which are used when no speaker's voice was prerecorded or when there is no such word in the data base which was prerecorded. When a speaker is talking, the spoken words are heard by the device and converted and matched by speech to text technology, to words in this table. The conversion (and detection) need not be in the hearing device. It could be in a remote device, such as a smart phone carried by the user or even a multitude of prepositioned hearing devices in the space which could be accessed by any device user, once linked. For example, in an auditorium, the speaker's feed could be transmitted to the hearing device by a carrier (such as Bluetooth®) or be converted to text and transmitted to the hearing device, thus saving conversion time.

The device may output entirely the actual spoken words when the clarity level is good enough for the user to rely entirely on that sound feed, but when an occasional word is unclear substitutions from the computer generated voice or on Speaker 1's voice will be made by using the mapping provided in the data base such as shown in the data table. (Note that the numbers shown are merely illustrative and only constitute ID/code numbers for computer retrieval).

The discrete word is assigned a code and a computer generated word with the same meaning is matched/mapped to that code and a synthesized voice speaking that word can be generated on the fly when needed or for speed, generated and stored in advance in the data base. When needed, the synthesized voice equivalent word can be sent to the sound reproducing element, which is hearable by the user as a substitute word for the one which was actually spoken. The substitute word will be inherently clearer to the user because it will have a superior signal to noise ratio. It could also be in a dialect better understood by that user. It could also be a translation of the spoken word (see FIG. 2), where the user may trigger a switch which inserts, for example, and English word where the spoken word was Danish or other language.

Since it is known that a hearing impaired person will have more conversational time with a small group of people than random people, it is possible to prerecord the voices of such a small group (individually) and store such words in a data table (See FIGS. 1 and 2, Speakers 1 and 2).

In such case the stored words, which have preferably been recorded individually, are stored in the data table and mapped to the discrete captured spoken words when processed. The device will make a first determination of whether the speaker is a known prerecorded speaker (by pattern matching, or manually by user selection), and then use such prerecorded words of the appropriate speaker until a word is encountered that has not been prerecorded. The data table will be used to find the computer generated equivalent. It could also store a list of such words which were not prerecorded but were previously needed in a streaming conversation, and such list could be supplied to that speaker for creating a supplemental recording ranking the most needed words first.

The device would then use the processor to match said discrete words to a data base code, and the appropriate synthesized words would be retrieved and used as a replacement for said spoken words.

This substitution could be automated on various criteria such as signal to noise ratio or a switch operated by the user to enable this mode. Actuation could be by user eye movement, head movement, hand gesture, voice etc.

The substituted generated word would preferably replace the existing spoken word, but in a stereo system, it could be supplied to one ear while the other ear hears the spoken word. It could also be displayed to user in text format, on a watch, heads up display, projection, etc.

Depending on the speed of the processor (local or remote), there may be a delay between real speech flow and speech flow with substituted words.

The device may insert a delay in the output of the sound reproducing element so that when said generated replacement words are outputted to said element, subsequent words being sent to the sound reproducing element are delayed to keep the word order unchanged and prevent overlap of sounds.

This could happen if the substitute words are a few milliseconds later than the real word. The remaining spoken words stream needs to be slowed or spaced to allow the late insertion.

To get the user back to "real time" hearing, the delay is gradually reduced by removing dead air spaces between word syllables until said delay is reduced to zero (compression with pitch control).

The device may also have a data look up table for storing ID tags or other indicia corresponding to converted sounds and discrete words generated by a synthesizer and wherein the processor is configured to match converted voice sounds to known discrete words in a look up data table and output said converted voice sound to the sound reproducing element.

The device may also have a data look up table for storing ID tags or indicia corresponding to converted sounds and discrete words of a previously recorded speaker and wherein said processor is configured to match converted voice sounds to known words of a previously recorded speaker in a look up data table and output said known words to the sound reproducing element. These could be the prerecorded distant speaker's voices and vocabulary.

The device may also be used to translate speech or words in a speech to another language. Often a listener will know many of the foreign language words spoken, but not all. By wearing a hearing assist device, when the speaker is speaking in a first language, and the user desires translation of at least some of said words in a second language, and wherein the device further includes a data look up table for storing ID tags, indicia, corresponding to converted sounds and discrete words captured in said first language and corresponding to ID tags to corresponding words generated by a synthesizer in a second language and wherein said processor is configured to substitute at least one of the words in the first language, with at least one of the corresponding words in the second language from the look up table and output said second language word to the sound reproducing element. The word could also be displayed on heads up display glasses.

FIG. 3 is like FIG. 2 except that prerecorded speaker's words have been omitted. More often the foreign language speaker will not have taken the effort to make the prerecording. In that case, computer generated substitutes are already in the table. In this case, Danish words of the speaker are mapped to computer generated voice of the English equivalent.

For foreign language use, the hearing ability of the user is less commonly an issue. Rather it is the lack of fully vocabulary which is being assisted.

It is also possible to use the device to operate in "wing man/woman" mode. Here a wing man/woman is a person who assists another in knowing the name of people they encounter. Often a person will encounter another who they recognize but can't remember their name or details of their life they need to know. The system can use voice recognition to pattern match to a data base of known voices and notify the user of the speaker's name, either by text (head's up display) or by sound into one of the user's ears. Voice pattern match technology is known in the art. For music Shazam® app/software provides such a tool.

So upon user activation, the substitute second language word could replace the unknown word or using stereo, the user could hear both, one in each ear. Using a display, the user could see the translated word but hear the actual foreign language word. The same result could be achieved for idiomatic phrases where the discrete words are known but the phrase has an idiomatic meaning. Activation by a user could translate and substitute the correct phase. If the data base included idioms, the substitution could be automated, so that user intervention is not needed.

The same solution to delay can be used in foreign language translation.

The device can preferably be switchable to a learning mode wherein a speaker can record discrete words into data base and wherein said discrete words are assigned a first code and wherein said converted words are, to the extent possible, assigned a second code correlated to a first code of a matching word, and when said switch is activated, said recorded words are substituted for said discrete words, thereby providing the user a clearer sounding substitute word in the voice of the speaker.

If there is no word match found from the learned/prerecorded data base, the system can fall back on the presumably larger synthesized voice of said discrete words, which will provide a user with a clearer sounding substitute word, but not in the speaker's voice.

A method preforming this disclosure includes all or any of the above techniques for example: a method of providing clearer word sounds to a user wearing a hearing assist device comprising the steps of:
a. processing the sound of a speaker of spoken words;
b. converting the spoken words into a plurality of discrete words and storing said discrete words in a first data base;
c. drawing from a second data base of synthesized words, replacing at least some of the discrete words from said first data base, with words of like meaning but generated by a synthesized voice, whenever words of like meaning are available in said second data base;
d. outputting said replaced words to a sound generator from the device, so that the user will hear at least some clearer synthesized words replacing actual speaker's words.

The method could also include, wherein at least some of said words from the speaker have been prerecorded into a data base and previously converted to words in said second data base and wherein at least some of said spoken words are substituted with said prerecorded words of the same meaning; so that the user may hear at least some prerecorded substitute words having greater clarity that some of said spoken words.

The method could also include, wherein at least some of said spoken words are substituted with synthesized speech words when the signal to noise level of said spoken words are below a predetermined threshold.

The method could also include wherein said spoken words are substituted with synthesized speech words when the user activates substitution.

The method could also include wherein said spoken words are substituted with synthesized speech words in a language different from said discrete words when activated by the user, so that the user will hear a translation of selected discrete words.

FIG. 1 is a schematic block flow diagram of one embodiment. A hearing device 2 has a sound input 10 typically a microphone or a remote sound pickup link to some device with a mic.

In one embodiment, the device has a mode control 12, which could be switch or sensor to switch between modes. In M1 mode 14, normal hearing aid functions, such as amplification 16 and filtering 18 are provided to the output device 20, such as a speaker.

In mode M2, the output from the sound input 10 is processed to convert the spoken word to speech to text 22. If there are multiple voices, this may result in separate speech to text outputs, but they can be differentiated into separate streams by voice print matching, i.e., similar voices are segregated as separate streams. The system would default to the loudest as being the one to further process, but the user could select by switch, between them.

The speech to text conversion 22 can be feed into a heads up display 24 or an earpiece 20, or a separate earpiece from 20 such as with a stereo system with two earpieces.

In Mode M3, the output from the sound input device 10 is processed to synthesized speech 26, which has identified the discrete words in the speech (essentially processing first speech to text and then back to speech though a speech generator). The process matches/maps the spoken words from the speech to speech process to synthesized computer generated speech and outputs all words 28 to the output 20 and into the user's ear. In such case, the speech the user hears is not the flowing speaker's voice but a synthetized recreation of all of the words. While this may not be as pleasant as the original distant speaker's voice, the s/n clarity ratio of what the user hears is dramatically improved.

A hybrid version of Mode M3 is similar to the above mode, but the user activates 30 when selected words 32 will be sent a synthesized voice to the user or as text to a heads up display 24. The user activation can include a preset automatic detection switch which determines which words are sufficiently garbled (perhaps based on the hearing loss of the user) which needs synthetic substitution. Otherwise, the user can trigger the switch on demand. The delay which is caused can be managed as explained elsewhere herein.

The term hearing aid is meant to be interpreted broadly as any user worn or implanted device which transmits sound to the user's ear or brain and is not limited.

The description above and its applications as set forth herein are illustrative and are not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. An assisted hearing device for a user comprising:
   a. at least one microphone to pick up voice sounds from a speaker;
   b. a sound reproducing element to provide sound output to a user;
   c. said device having said microphone for picking up voice sounds from a speaker,
   d. a processor configured to convert at least some voice sounds into discrete separate spoken words and storing said words in a database,
   e. generating a corresponding computer synthesized equivalent version of said discrete separate spoken words; storing said discrete separate spoken words and said corresponding synthesized words in a data base as pairs of words;
   f. a threshold switch, configured to determine if a discrete separate spoken word has at least a predetermined threshold signal to noise (s/n) ratio and thus be transmitted on to the sound reproducing element; and if not, to substitute said discrete separate spoken word with its corresponding synthesized word, and pass said synthesized word to the sound reproducing element in place of said discrete separate spoken word;
   so that, the user will hear, via the sound reproducing element, discrete separate spoken words interspersed with synthesized words, replacing discrete separate spoken words, where said spoken words have a signal to noise ratio below said predetermined signal to noise ratio; thereby providing the user a clearer sounding substitute word.

2. The device of claim 1 wherein said predetermined threshold is when a separate spoken word is determined by the threshold switch to be unintelligible to a human ear.

3. The device of claim 1 including an operational mode, wherein said predetermined threshold is set such that all discrete spoken words are replaced by synthesized words, so that the user hears only synthesized words.

4. The device according to claim 1 further including a controller for compensating for any delay introduced between real-time speech of the speaker and speech including substitution of synthesized words, said compensation including a speech compressor to remove dead-air spaces between word syllables until real time speech and speech outputted by the device are substantially in sync.

5. The device of claim 1 wherein said threshold switch can be configured to substitute a single synthesized word or a plurality of synthesized words.

6. The device of claim 1 wherein the device has left and right sound reproducing elements and wherein the discrete spoken word is transmitted to one of said elements and the synthetic version is transmitted to the other of said elements simultaneously.

7. The device of claim 1 wherein said corresponding synthesized words are prerecorded words in the speaker's voice.

8. The device of claim 1 further including a learning mode, wherein a speaker can record discrete words into a data base and wherein said discrete words are converted into corresponding speaker synthesized words to replace corresponding computer synthesized words, so that the user will hear the speaker's own voice.

9. The device of claim 1 wherein at least one microphone includes a plurality of directional microphones and wherein said device determines where the user's head is looking, and electronically orients said plurality of microphones into a unidirectional mode in the direction the user is looking.

10. The device of claim 1 further including at least one remote microphone linked to the device and capable of being located closer to the speaker than the device microphone and wherein said device actives said remote microphone in response to a user's gesture.

11. The device of claim 1 wherein at least one microphone includes a plurality of directional microphones and wherein said device determines where the user is finger pointing, and orients said plurality of microphones in a unidirectional mode in the direction which the user's finger is pointing).

12. The device of claim 1 wherein said corresponding synthesized word is generated in a predetermined foreign language equivalent of said discrete separate spoken word.

13. An assisted hearing device for a user comprising:
   a. at least one microphone to pick up voice sounds from a speaker;
   b. a sound reproducing element to provide sound output to a user;
   c. said device having said microphone to pickup voice sounds from a speaker,
   d. a processor configured to convert voice sounds into discrete separate spoken words and storing said words in a database,
   e. generating a corresponding computer synthesized equivalent version of said discrete separate spoken words; storing said discrete separate spoken words and said synthesized words in a data base as pairs of words;
   f. a threshold switch, configured to determine if a separate spoken word has at least a predetermined threshold signal to noise (s/n) ratio, and thus be transmitted on to the sound reproducing element; and if not, to substitute a corresponding synthesized word, and pass said synthesized word to the sound reproducing element in place of said separate spoken word, but not in the speaker's voice;
   g. a controller for compensating for delay introduced from real time sound as result of the substitution of synthesized words, said compensation including a speech compressor while maintaining speech with an unaltered pitch;
   so that, the user will hear, via the sound reproducing element, discrete separate spoken words interspersed with synthesized words, replacing spoken words, where said spoken words have a signal to noise ratio below said signal to noise ratio; thereby providing the user a clearer sounding substitute word in the voice of the speaker.

14. A method of providing clearer word sounds to a user wearing a hearing assist device comprising the steps of:
   a. processing the sound of a speaker and converting said sound into discrete spoken words and storing said discrete spoken words in a data base;
   b. converting said discrete spoken words into a synthesized word version of said discrete spoken words and storing said discrete spoken words in said database as equivalent pairs;
   c. determining the signal to noise (s/n) ratio of the discrete spoken words;
   d. for those spoken words having an s/n ratio less than a predetermined threshold, substituting said discrete spoken words with the synthesized word version thereof;
   e. outputting to a sound generator from the device, a stream of words which include said discrete spoken words and substituted word versions, so that the user will hear at least some clearer synthesized words replacing actual speaker's words; and
   f. compensating for any delay from real time sound introduced as a result of the insertion of synthesized words by removing dead-air spaces between word syllables, until real time speech and speech outputted by the device are substantially in sync.

15. The method of claim 14 wherein said device includes a plurality of directional microphones, and the method includes determining where the user's head is looking and orients said plurality of microphones in a unidirectional mode in the direction which the user is looking.

16. The method of claim 14 wherein said device includes a plurality of directional microphones, and the method includes determining where the user's finger is pointing), and orients said plurality of microphones in a unidirectional mode in the direction which the user is pointing.

17. The method of claim 14, further including the step of actuating the use of substitute versions of spoken words by a user initiated gesture.

18. The method of claim 14, wherein the gesture is touching the device.

19. The method of claim 14 wherein the gesture is the user speaking a predetermined word.

20. The method of claim 14, further including a learning mode wherein a speaker can record discrete words into a data base; and wherein said discrete words are converted into corresponding speaker synthesized words to replace corresponding computer synthesized words, so that the user will hear the speaker's own voice for all words.

21. The method of claim 14, further including an operational mode, wherein said predetermined threshold is set such that all discrete spoken words are replaced by synthesized word versions so that the user hears only synthesized words.

* * * * *